Oct. 23, 1951     H. E. ROBERTSON     2,572,763
LIVE FISH BAIT CONTAINER
Filed April 12, 1948     2 SHEETS—SHEET 1
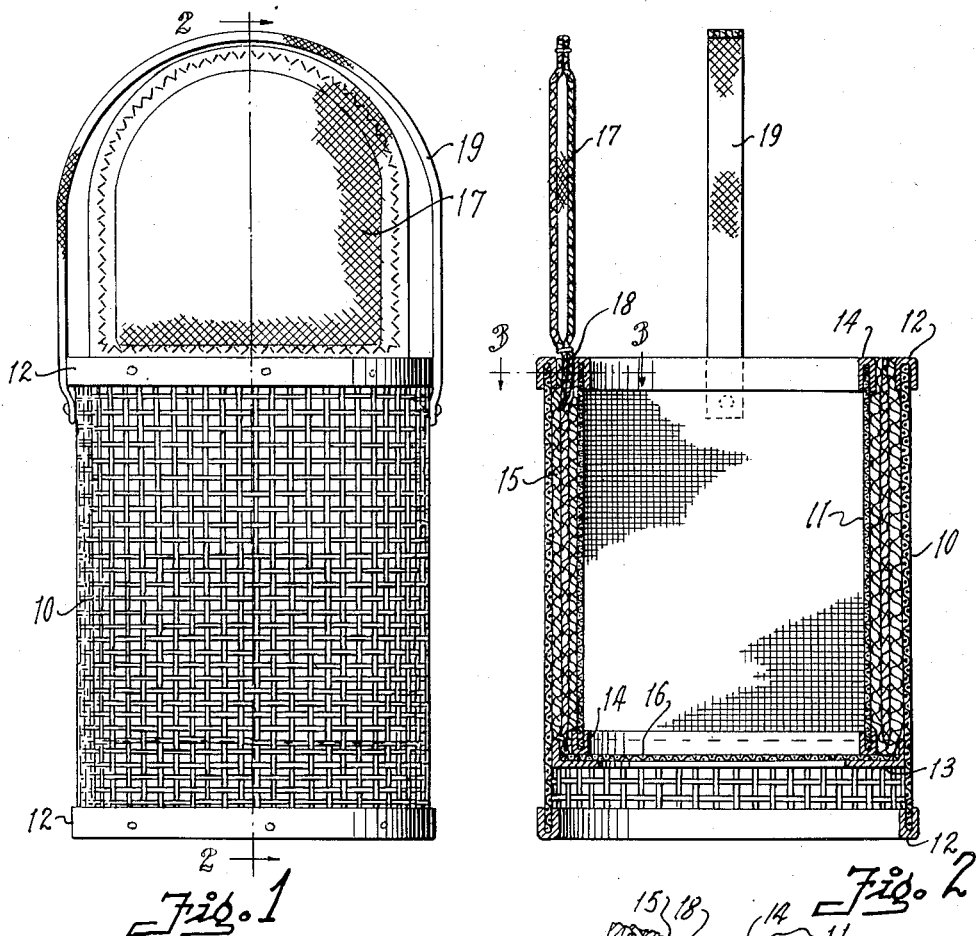
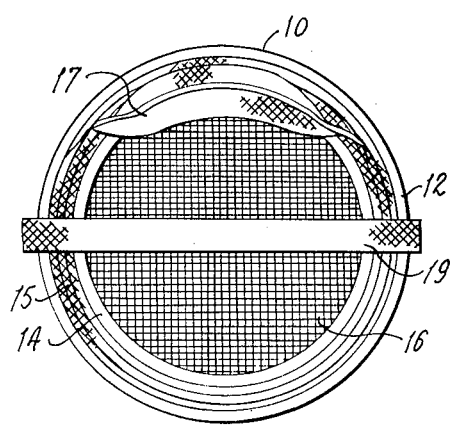
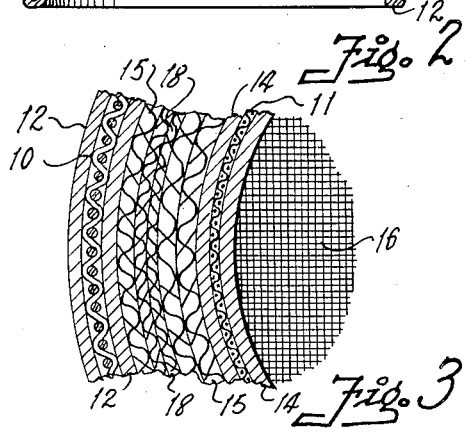
Inventor
Harvey E. Robertson

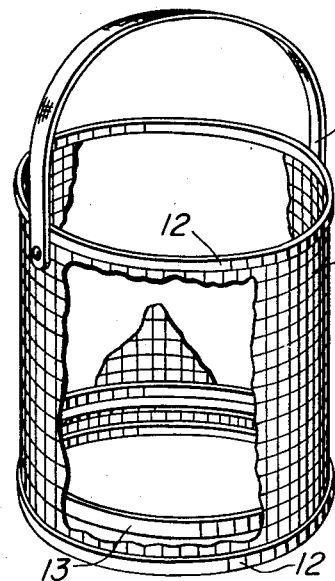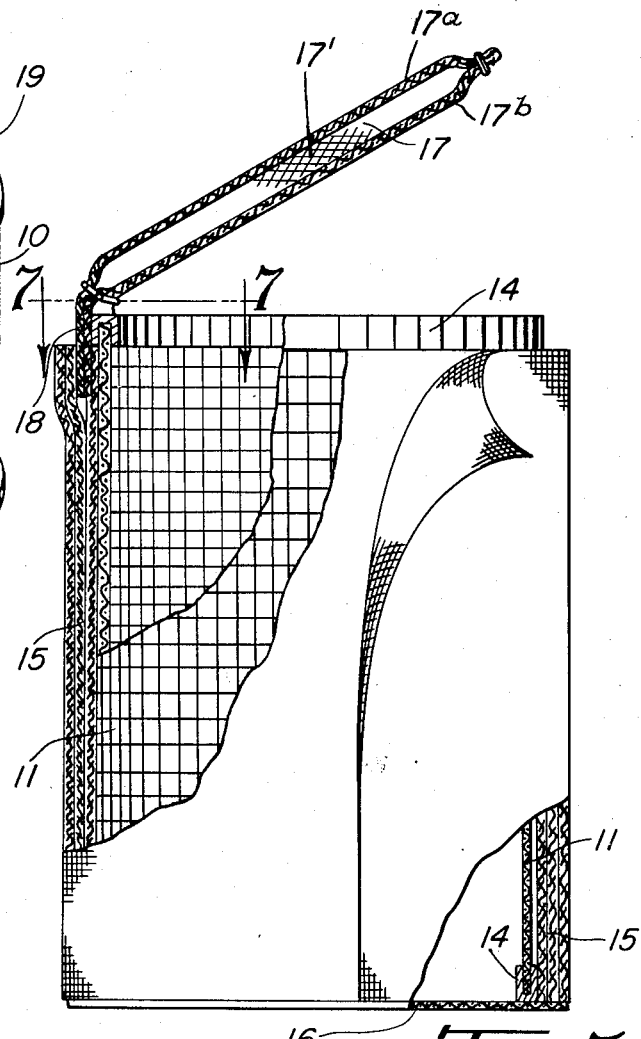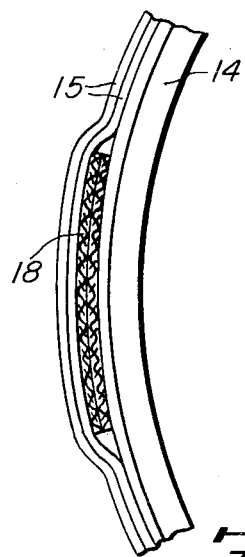

Patented Oct. 23, 1951

2,572,763

UNITED STATES PATENT OFFICE 2,572,763

LIVE FISH BAIT CONTAINER

Harvey E. Robertson, Dallas, Tex.

Application April 12, 1948, Serial No. 20,500

1 Claim. (Cl. 43—55)

This invention relates to new and useful improvements in live fish bait containers.

One object of the invention is to provide an improved fish bait container, in which bait, such as worms, may be stored and kept alive for a period of more than 48 hours, and, normally, for an indefinite length of time.

Another object of the invention is to provide a bait container in which worms may be stored, more or less under aerated conditions, in that air may freely circulate through the container walls and at the same time the air currents may be moistened, whereby the worms will not only be kept alive but will be induced to stay in the container.

A further object of the invention is to provide a bait container including an outer foraminous enclosure or cage and a foraminous vessel or bait holder mounted in the cage and spaced therefrom sufficiently to permit one or more layers of coarse cloth or other absorbent material to be wound around the bait holder and moistened, whereby moist air currents may pass through the container.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is an elevation of a bait container constructed in accordance with the invention, the cover being open to an upright position, Fig. 2 is a vertical sectional view taken on the line 2—2 of Fig. 1, Fig. 3 is an enlarged, transverse sectional view taken on the line 3—3 of Fig. 2, Fig. 4 is a plan view of the container, the cover being swung back and down to show the hinge tab, Fig. 5 is a side elevation, partly broken away, of the inner portion of the container, Fig. 6 is a reduced perspective view of the outer portion of the container, and Fig. 7 is a sectional view taken on the line 7—7 of Fig. 5.

In the drawing, the numeral 10 designates the outer cylindrical, metal mesh shell or cage of the container and 11, the inner cylindrical vessel or bait holder. The cage is preferably formed of a wire mesh material, such as coarse wire cloth and ¼ inch mesh has proven satisfactory. The material is suitably formed into a cylinder and has annular ferrules 12 secured to its top and bottom.

Within the cage a flanged supporting ring 13 is secured to the inner surface thereof, as by soldering, and spaced above the bottom ferrule 12. The bait holder 11 rests on a foraminous bottom 16 having its marginal portion supported on the ring and may be readily withdrawn upwardly from the cage. The bait holder is formed of a relatively fine mesh, wire material, such as ordinary window screen, or preferably, wire cloth of 30—50 mesh. This material is suitably made into a cylinder with top and bottom ferrules 14. The cage and bait holder may be made of non-rusting and non-corroding materials.

The bait holder is sufficiently less in diameter than the cage to provide an annular space therebetween. A strip of cloth or fabric, such as burlap or other absorbent material, is arranged around the bait holder 11 so as to extend from one ferrule to the other ferrule thereof and completely enclose said holder to form a jacket 15. One or more layers or thicknesses of the burlap may be used and the free end of the wound strip may be secured in place in any desirable fashion. In the drawing three layers or circumferential wrappings of the burlap are shown as forming the jacket 15. The spacing between the cage and the bait holder should be ample to permit the holder and the cloth jacket to be freely inserted and removed. The ferrule 14 is secured to the bottom of the cylindrical bait holder 11, and rests upon, and is secured to the flat bottom 16 which may be made of the same material as said bait holder. This bottom rests upon the horizontal bottom or inwardly directed flange of a supporting ring 13, which is right-angular in cross-section and has its vertical portion or upright flange suitably fastened upon the inner surface of the cylindrical wall of the cage 10. The marginal portion of the bottom 16 extends beyond the ferrule 14 and supports the bottom edges of the jacket 15. The ring 13 is spaced a substantial distance above the bottom ferrule 12 so as to expose an ample cylindrical portion of the cage between said ferrule and the ring, whereby ample cross ventilation and admission of air below the bottom 16, is provided and air circulation through said bottom is had.

If desired, a cover 17 formed of several layers of cloth, preferably coarse, may be mounted on the bait holder. The cover has a hinge tab 18 stitched between the upper edges of the jacket layers and is large enough to overlie the top ferrule 14 of the holder. This cover has its outer layers 17a, 17b of larger diameter than its inner layer or filling 17' and these outer layers are stitched together around their margins and the hinge tab 18 across the bottom, is merely a portion of the margins of the outer layers inserted between and stitched to, the upper edge portions of two of the layers of the jacket 15. Obviously, other types of permeable covers may be used with success. A bail or handle 19 may be attached to the upper portion of the cage.

In using the container, the device is immersed in water long enough to saturate the cloth jacket 15 or, if desired, the bait holder 11 may be removed and the jacket saturated. The live bait, such as worms, hellgrammites, and the like, are placed in the bait holder and a small quantity of moss or earth may be placed in the holder. In transporting the container it is placed in an exposed position where air currents may pass through it. If necessary, it may be again moistened.

The container may be hung on the limb of a tree and the bait kept alive and in captivity for an indefinite period of time. So long as the jacket 15 remains moist, the container will preserve the bait and since the several cloth layers will retain their moisture for several hours, under ordinary weather conditions, frequent moistening of the jacket is not necessary. It is pointed out that the success of the device is due to the structure whereby horizontal or cross currents of moist air may flow through the bait holder; thus, unless the vertical wall of the cage is highly foraminous the device will not function properly.

The fine wire cloth bait holder 11 adequately retains dirt and particles of moss which may be placed therein and thus prevents this material from working into the jacket 15. However, the cloth of the holder permits efficient circulation of air and is readily removed, separately from the jacket, for cleaning. The jacket also is separately removable for cleaning or replacement since it merely rests within the cage 10 in a frictional manner and receives the holder 11 in a similar manner. In warm weather, the jacket is moistened and functions to cool and protect the bait. Also, in cooler weather, the jacket may be left dry to protect the bait from lowered temperatures. In either instance, the jacket acts as a protective covering to maintain the interior of the holder 11 at a moderate temperature, while insuring the circulation of adequate air to keep the bait in optimum condition. The coarse cloth or other foraminous material of which the top or cover 17 is made, along with the wire cloth bottom 16, encourage the ready circulation of air and increase the effectiveness of the container. With proper care, such as periodic moistening and feeding, baits of various types may be kept in excellent condition in this container for indefinite periods of time.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

A fish bait container including, an outer metal mesh shell of cylindrical form, a ring secured on the interior of said shell on the wall thereof, said ring having a vertical portion and a horizontal bottom, the latter being spaced from the bottom of the shell, a disk of metal mesh supported on the horizontal bottom and abutting the vertical wall, a cylindrical member of metal mesh of smaller diameter than the ring having its lower edge portion secured to the disk in spaced relation to the vertical wall of the ring, a fabric moisture-holding material secured to the cylindrical member exteriorly thereof in abutting relation with the disk and the vertical wall of the ring, and a cloth cover having one edge thereof embedded in the fabric moisture-holding material and constituting means to raise and lower the cylindrical member and fabric material relative to the shell.

HARVEY E. ROBERTSON.

REFERENCES CITED

The following references are of record in the file of this patent:

UNITED STATES PATENTS

| Number | Name | Date |
| --- | --- | --- |
| 531,112 | Gilmore | Dec. 18, 1894 |
| 608,304 | Rigg | Aug. 2, 1898 |
| 894,973 | Morgan | Aug. 4, 1908 |
| 920,313 | Franklin | May 4, 1909 |
| 981,205 | Loetzer | Jan. 10, 1911 |
| 1,013,514 | Rand | Jan. 2, 1912 |
| 1,270,631 | Lewis | June 25, 1918 |
| 1,698,018 | Hendricks | Jan. 8, 1929 |
| 1,843,563 | Knoernschield | Feb. 2, 1932 |
| 1,883,135 | Walker et al. | Oct. 18, 1932 |
| 2,328,993 | Norling | Sept. 7, 1943 |

FOREIGN PATENTS

| Number | Country | Date |
| --- | --- | --- |
| 20,720 | Norway | Apr. 27, 1910 |